United States Patent
Cattin et al.

(10) Patent No.: US 7,100,535 B2
(45) Date of Patent: Sep. 5, 2006

(54) SYSTEM FOR REARING AQUATIC ANIMALS

(75) Inventors: Peter Malcolm Cattin, Auckland (NZ); Philip Stanley Crosier, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 96 days.

(21) Appl. No.: 10/484,467

(22) PCT Filed: Jul. 30, 2002

(86) PCT No.: PCT/NZ02/00140

§ 371 (c)(1),
(2), (4) Date: Jul. 9, 2004

(87) PCT Pub. No.: WO03/011018

PCT Pub. Date: Feb. 13, 2003

(65) Prior Publication Data

US 2004/0237902 A1    Dec. 2, 2004

(30) Foreign Application Priority Data

Jul. 30, 2001  (NZ) ........................ 513251
May 13, 2002  (NZ) ........................ 518905

(51) Int. Cl.
*A01K 63/00*   (2006.01)
(52) U.S. Cl. .................. 119/245; 119/224; 119/251
(58) Field of Classification Search .............. 119/215, 119/217, 224, 226, 227, 245, 246, 251, 252; 210/169; 43/55, 56
See application file for complete search history.

(56) References Cited

U.S. PATENT DOCUMENTS

| | | | |
|---|---|---|---|
| 3,146,195 A * | 8/1964 | Berardi | 210/169 |
| 3,584,602 A * | 6/1971 | Stasio | 119/252 |
| 4,723,511 A * | 2/1988 | Solman et al. | 119/224 |
| 5,308,483 A * | 5/1994 | Sklar et al. | 210/232 |
| 5,843,768 A * | 12/1998 | Lin et al. | 435/290.1 |
| 6,093,566 A * | 7/2000 | Katznelson | 435/287.1 |
| 6,382,134 B1 * | 5/2002 | Gruenberg et al. | 119/215 |
| 6,659,043 B1 * | 12/2003 | Huska | 119/226 |

FOREIGN PATENT DOCUMENTS

| | | |
|---|---|---|
| DE | 296 14 909 U1 | 12/1996 |
| FR | 2 473 843 | 7/1981 |
| JP | 10257835 | 9/1998 |
| RU | 797625 | 1/1981 |
| RU | 1017241 | 5/1983 |
| RU | 1421281 | 9/1988 |

* cited by examiner

*Primary Examiner*—Teri Luu
*Assistant Examiner*—Kimberly S. Smith
(74) *Attorney, Agent, or Firm*—Hogan & Hartson LLP

(57) ABSTRACT

A container 10 for rearing aquatic animals includes a floor portion 12 which defines a plurality of openings. A wall portion 100 bounds the floor portion 12 to form, together with the floor portion 12, a chamber for receiving the aquatic animals to be reared. A filter 105 is arranged in the openings of the floor portion 12. A closure plate 103 openably closes the openings in the floor portion 12. The invention extends also to a system which includes a plurality of the containers 10. The containers 10 are supported, in a partially immersed state in a vessel of the system. A circulating arrangement of the system circulates water through the containers 10.

20 Claims, 5 Drawing Sheets

SYSTEM FOR REARING AQUATIC ANIMALS

FIELD OF THE INVENTION

This invention relates to the rearing of aquatic animals. More particularly, the invention relates to a container for rearing aquatic animals and to a system, including such container, for rearing aquatic animals.

BACKGROUND TO THE INVENTION

Aquatic animals are commonly reared for commercial or research purposes and for the ornamental fish market, as well as (on occasion) for species preservation reasons. Current practices, whether in laboratory conditions or in commercial conditions, for rearing aquatic animals from embryo stages often manifest a mortality rate of more than 80%. Such a figure is typical in the case of zebrafish (*Danio rerio*) which are popular for use in genetic research and which, as a result, are often bred in laboratories. In genetic research particularly, such a high mortality rate can, result in the extinction of valuable species, strains or constructs, some of which may have an inherently diminished ability to survive. In commerce, this degree of mortality renders many forms of aquaculture marginally economically viable.

There is a growing need for commercial fish farming as many stocks of feral fish types have been fished almost to extinction.

Existing rearing practices leave a lot to be desired. For example, it is common to "catch" the animals being reared from time to time in a mesh sieve, as when transferring them from one container to another. Forced contact with hard surfaces results in perforation of the protective mucus layer of the animal which may result in infection of the animal by micro-organisms including pathogens.

It is undesirable that a growing animal wastes effort (and hence metabolites) in swimming against a current such as those resulting from recirculating equipment as used in the rearing environment.

Certain types of existing rearing containers include devices resembling chemist's separating funnels with a water flow introduced from below and overflowing at the top. There is a significant current, a risk of losses of animals by being caught in the overflow or injury caused by a restrictive screen.

Another rearing device makes use of a plastics box with a "V" shaped notched overflow at one end. Again, animals may be trapped in the overflow or lost from the container through the notch. Bubbles of air are frequently used for aerating and stirring the water but the resulting currents may be too severe for many purposes.

In this specification, the term "aquatic animal" is to be understood, unless the context clearly indicates otherwise, as a fresh water or marine water animal and includes vertebrate and invertebrate animals.

SUMMARY OF THE INVENTION

According to a first aspect of the invention, there is provided a container for rearing aquatic animals, the container including:

a floor portion which defines at least one opening;

a wall portion bounding the floor portion to form, together with the floor portion, a chamber for receiving the aquatic animals to be reared;

a filtering means arranged in the at least one opening; and a closure means for openably closing the at least one opening.

Preferably, the floor portion comprises a multi-layered structure. The multi-layered structure may comprise a support member for supporting the filtering means and a retaining member for retaining the filtering means relative to the support member with the filtering means being interposed between the support member and the retaining member.

The support member may define at least one passage with the retaining member also defining at least one passage, the passages of the support member and the retaining member being in register with each other to define the at least one opening in the floor portion.

Preferably, each of the support member and the retaining member define a plurality of passages to form a plurality of openings in the floor portion.

The retaining member may be demountably arranged relative to the support member for facilitating access to the filtering means for replacement purposes or cleaning purposes. The filtering means may be an element of a foraminous material. More particularly, the filtering means may be a mesh of a predetermined gauge which is held releasably captive between the support member and the retaining member. The gauge of mesh used may be dependent on the age, size and type of aquatic animal accommodated in the container.

The closure means may comprise a closure plate displaceably arranged relative to the multi-layered structure. Further, the closure means may include a displacement mechanism for displacing the closure plate relative to the multi-layered structure.

The support member of the multi-layered structure may include a substantially centrally disposed tubular member. The tubular member may project from an operatively upper surface of the support member. A free end of the tubular member may terminate at a height above a rim of the wall portion of the container. The displacement mechanism may include a screw-threaded rod received in a passage of the tubular member, the rod having a first end fast with the closure plate and an opposed end protruding through the free end of the tubular member. A displacing element may be mounted on the opposed end of the rod. The displacing element may be a knurled wheel that is screw-threadedly received on the rod to bear against the free end of the tubular member.

A sealing means may be carried by the closure plate. The sealing means may be in the form of an O-ring and may be carried on that surface of the closure plate facing the multi-layered structure.

According to a second aspect of the invention, there is provided a system for rearing aquatic animals, the system including:

a vessel defining a volume;

at least one container, as described above, supported to lie at least partially within the volume of the vessel; and a circulating arrangement for circulating liquid through the at least one container.

In a preferred embodiment of the invention, the system includes a plurality of the containers arranged in an array, with each of the containers being supported to be at least partially immersed, in use, in water contained in the volume of the vessel.

The circulating arrangement may include a feed manifold arranged above the containers for feeding liquid at a predetermined rate to the containers. The manifold may include a flow control means for controlling the supply of liquid (water) to each of the containers. The flow control means may comprise a tap or valve associated with each container. By adjusting the tap, the flow rate of water to each container may be accurately controlled to provide water at a drip feed rate to each container. It will be appreciated that, by drip feeding water into each container, a very weak current is created in the container that is sufficient to circulate and gradually displace the water in the containers and, hence, the vessel. The current generated is sufficient to remove detritus from the containers through the openings in the floor portions of the containers without adversely affecting the animals in the containers.

The circulating arrangement may include a liquid treating means arranged upstream of the manifold. The liquid treating means may comprise a filter device and a sterilising station. The filter device may be a multi-stage filter having a first, coarse stage and a second, fine stage. The coarse stage may be a 5 micron-nominal filter and the fine stage may be a 0.2 micron-absolute filter. The sterilising station may be an ultra-violet sterilising device.

The liquid treating means may also include a reservoir arranged upstream of the filter device and the sterilising station, the reservoir being in communication with the volume of the vessel for receiving detritus from an interior of the vessel.

The reservoir may include a processing means for processing the detritus. The processing means may comprise a biofilter. The biofilter may be populated with micro-organisms capable of converting nitrite ions and dissolved ammonia into nitrate ions thereby ridding the water of excreted nitrogenous materials.

The reservoir may communicate with an outlet opening of the vessel. Preferably, the vessel has an angled bottom with the outlet opening being arranged at a lowest point of the bottom of the vessel so that the detritus is urged towards the outlet opening.

The circulating arrangement may include a circulating means in the form of a pump.

The system may also include a temperature regulating unit for regulating the temperature of the liquid in the vessel.

BRIEF DESCRIPTION OF THE DRAWINGS

The invention is now described by way of example with reference to the accompanying drawings in which.

DETAILED DESCRIPTION OF THE INVENTION

Figure 1:
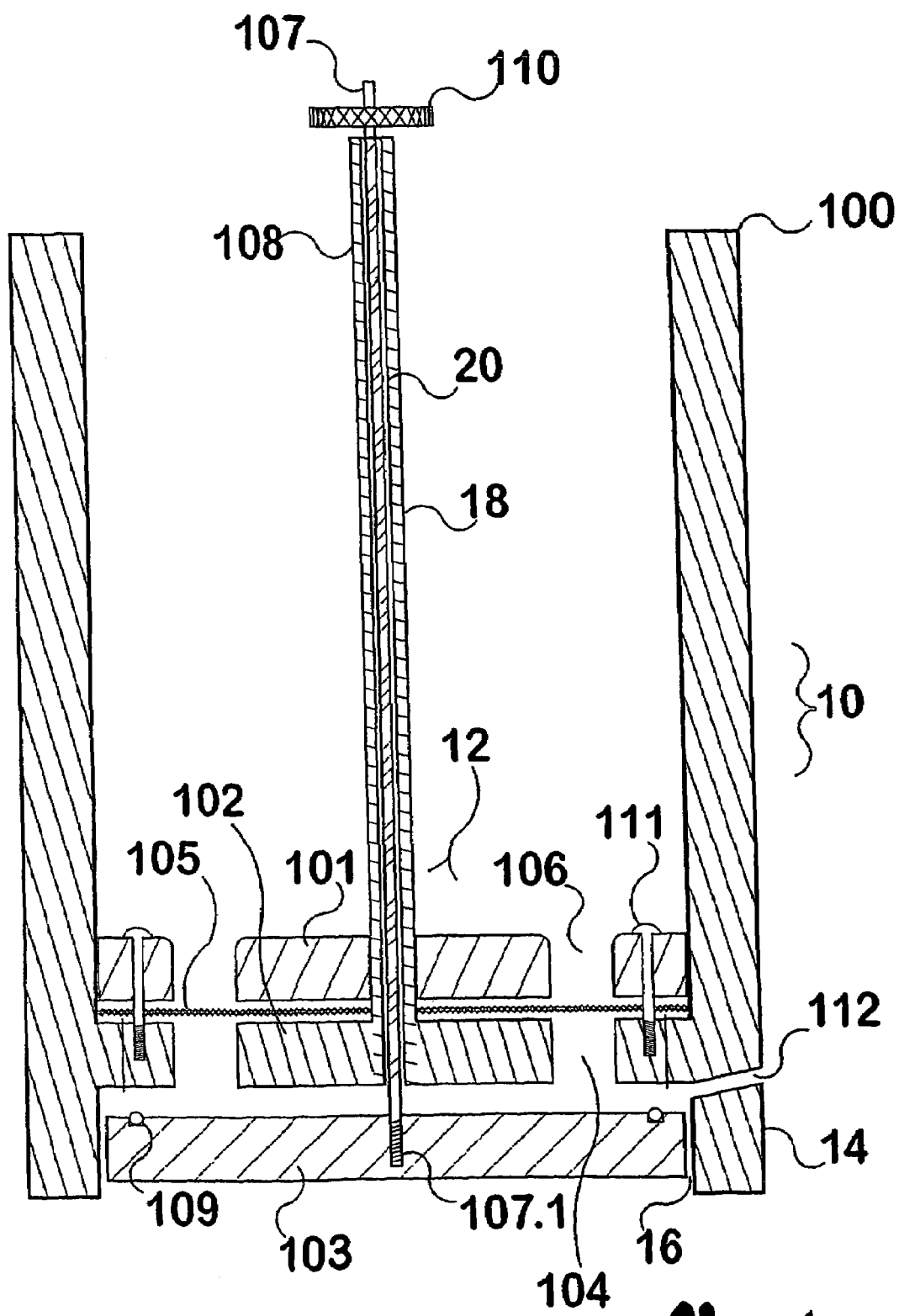
FIG. 1 shows a sectional, side view of a container, in accordance with a first aspect of the invention, for rearing aquatic animals.

Referring initially to FIG. 1 of the drawings, a container, in accordance with the invention, for rearing aquatic animals, is illustrated and is designated generally by the reference numeral 10. The container 10 includes a floor portion 12 in the form of a multi-layered structure. A wall portion 100 bounds the floor portion 12. The container 10 is open topped but may, if desired, be covered by a cover element such as a dust cover (not shown).

Further, the container 10 is made of a transparent material so that aquatic animals accommodated in the container 10 are visible, in use. Preferably, the container 10 is of a transparent, synthetic plastics material which is bio-compatible. For example, the container 10 could be of a polymethyl methacrylate, or similar, material.

The multi-layered structure of the floor portion 12 of the container 10 includes a support member 102 which supports a filter 105 of a foraminous material. The support member 102 defines a plurality of openings 104.

The multi-layered structure of the floor portion 12 further includes a retaining member 101 which is a snug fit in the interior of the container 10 and is releasably secured via fasteners, such as screws 111, to the support member 102. The retaining member 101 and the support member 102 sandwich the filter 105 between them. Because the retaining member 101 is releasably secured to the support member 102, the retaining member 101 can be removed to enable access to be gained to the filter 105 for replacement or cleaning purposes. It is to be noted that, in FIG. 1 of the drawings, the retaining member 101 is shown in a loosened condition relative to the support member 102 for clarity and explanation purposes. In use, the retaining member 101 is fast against the support member 102 to hold the filter 105 captive.

The retaining member 101 defines a plurality of passages 106. When the retaining member 101 is mounted in position relative to the support member 102, the passages 106 of the retaining member 101 are in register with the passages 104 of the support member 102 to define openings through which detritus can pass, as will be described in greater detail below. It will be appreciated that the openings are partially occluded by the filter 105 for filtering material passing through the openings but inhibiting the escape of the aquatic animals.

The container 10 includes a closure means in the form of a closure member or closure plate 103 arranged beneath the support member 102. The closure plate 103 is accommodated in a recess defined by a flange 14 of the wall portion 100 extending beyond the support member 102. The closure plate 103 is a rattling fit within the flange 14 to define a slit 16 through which water can pass. An air bleed bore 112 is defined in the flange 14 to allow the escape of air trapped within the flange 14 between the closure plate 103 and the support member 102, in use, when the container 10 is first placed in a body of water and which is unable to purge through the filter 105 due to the fineness of the mesh of the filter 105 and the weight of the column of water above the filter 105.

An operatively upper surface of the closure plate 103 supports a sealing member in the form of an O-ring 109. The O-ring 109 stands proud of the upper surface of the closure plate 103 to abut a lower surface of the support member 102 to effect sealing of the openings in the floor portion 12.

The container 10 includes a displacement mechanism 18 for displacing the closure plate 103 into, and out of, sealing abutment with the support member 102 of the floor portion 12.

The support member 102 supports a substantially centrally disposed tubular member 108. The tubular member 108 is co-axially arranged on a longitudinal axis of the container 10.

The displacement mechanism 18 includes a threaded shaft 107 that passes through a passage 20 defined by the tubular member 108. An end 107.1 of the shaft 107 of the displacement mechanism 18 is held fast with the closure plate 103. An opposed end of the shaft 107, protruding through a free end of the tubular member 108, supports a displacing element in the form of a knurled wheel 110.

While the wheel 110 is shown spaced from a free end of the tubular member 108, it will be appreciated that, in use, the knurled wheel 110 abuts the free end of the tubular member 108. Rotation of the knurled wheel 110 moves the closure plate 103 into and out of abutment with the lower surface of the support member 102.

When the closure plate 103 is in abutment with the support member 102, the O-ring 109 seals against the lower surface of the support member 102 closing off the openings in the floor portion 12 so that the container 10, with its contents, can be removed from the body of water in which it is partially immersed.

The filter 105 is made of a nylon mesh and, for zebrafish rearing, either a 250 micron (for the youngest fry) or a 500 micron (for older fry) nylon mesh is used. The containers 10 are labelled accordingly together with other pertinent information such as batch numbers etc. It will be appreciated that, to access the filter 105, the container 10 can be removed from its body of water, the retaining member 101 removed by removing the screws 111 and the filter 105 cleaned or replaced, as the case may be.

Figure 2:
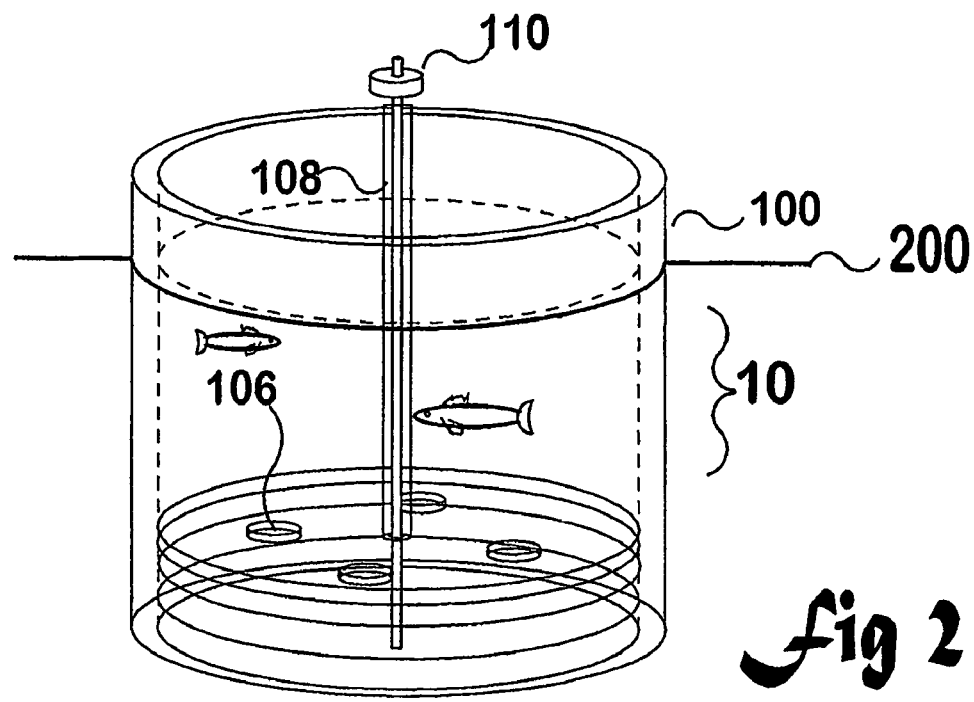
FIG. 2 shows a three-dimensional view of the container, in use.

A plurality of the containers 10 are used in a system 50 (FIG. 3), in accordance with a second aspect of the invention, for rearing aquatic animals. The system 50 comprises a vessel or tank 300 defining a volume 300.1. A plurality of the containers 10 are supported, in a partially immersed state, as indicated by water meniscus 200 in FIG. 2 of the drawings, on a support structure 514 (FIG. 5) arranged below the top of the tank 300.

The system 50 includes a circulating arrangement 306 mounted above the tank 300. The circulating arrangement 306 includes a water feed manifold 307, 308 arranged above the tank 300. The manifold 307, 308 is of a biofilm-resistant material. Preferably the manifold 307, 308 is of a polypropylene-based plastics material such as that sold under the trade mark "FUSIOTHERM"® ("FUSIOTHERM" is a registered trade mark of aquatherm GmbH, Germany).

Figure 3:
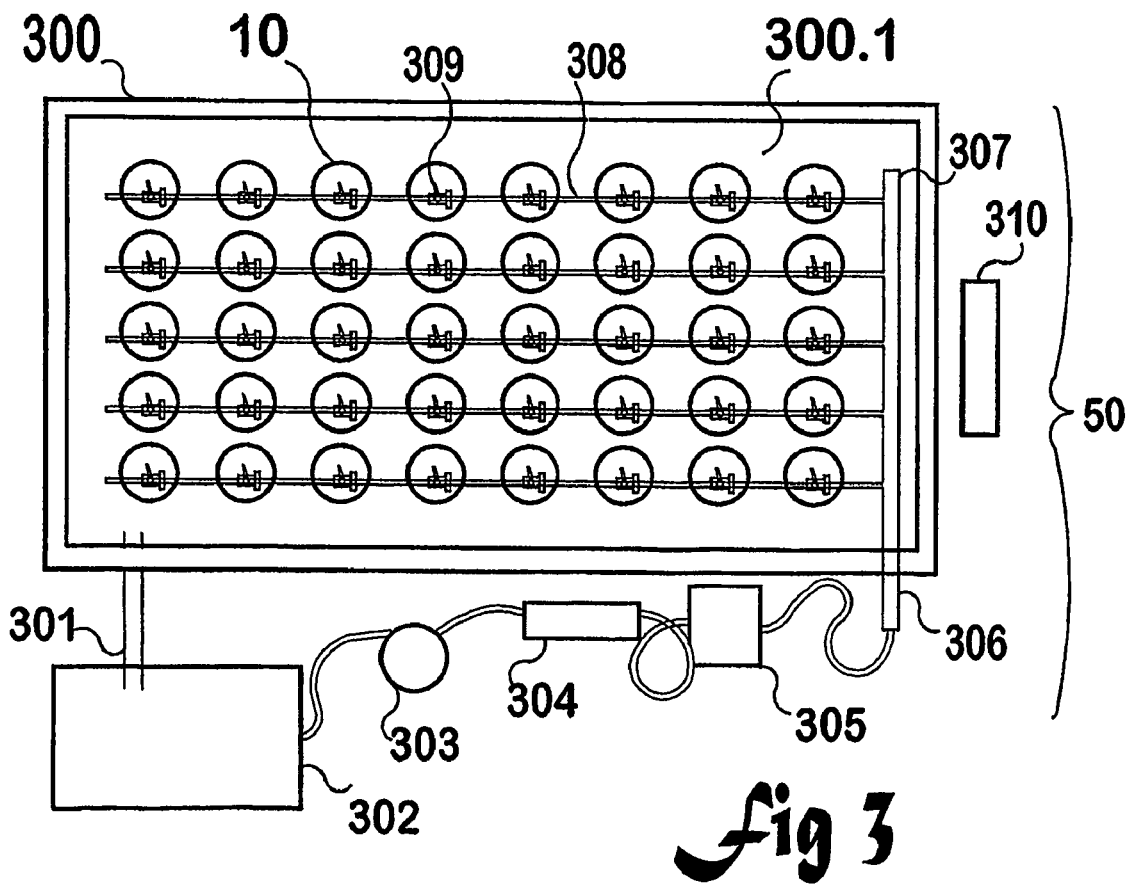
FIG. 3 shows a plan view of a system, in accordance with a second aspect of the invention, for rearing aquatic animals.

The manifold 307, 308 comprises a supply manifold 307 and a plurality of branch pipes 308 extending in parallel spaced relationship from the supply manifold 307. Each branch pipe 308 supports a plurality of longitudinally spaced valves or taps 309. The taps 309 are spaced such that a container 10 is receivable beneath each tap 309. Accordingly, an array of containers 10 is supported below the branch pipes 308 in the tank 300 in a partially immersed state in the water 200. It is to be noted that, what is illustrated in FIG. 3 of the drawings is a schematic representation of the system 50. The supply manifold 307 is, in use, arranged so that pressure drop in the branch pipes 308 is minimised.

The circulating arrangement 306 includes a liquid treating means or assembly arranged upstream of the supply manifold 307.

The assembly includes a reservoir 302 which communicates with the volume 300.1 of the tank 300 via an outlet pipe 301. A circulating means or pump 303 is arranged downstream of the reservoir 302.

A high pressure side of the pump 303 enters an inlet end of a filter 304 which, in turn, feeds into a sterilising station 305. The sterilising station 305 connects to an inlet end of the supply manifold 307.

The reservoir 302 includes a biofilter having biological organisms which convert ammonia and nitrites into nitrates.

Figure 5:
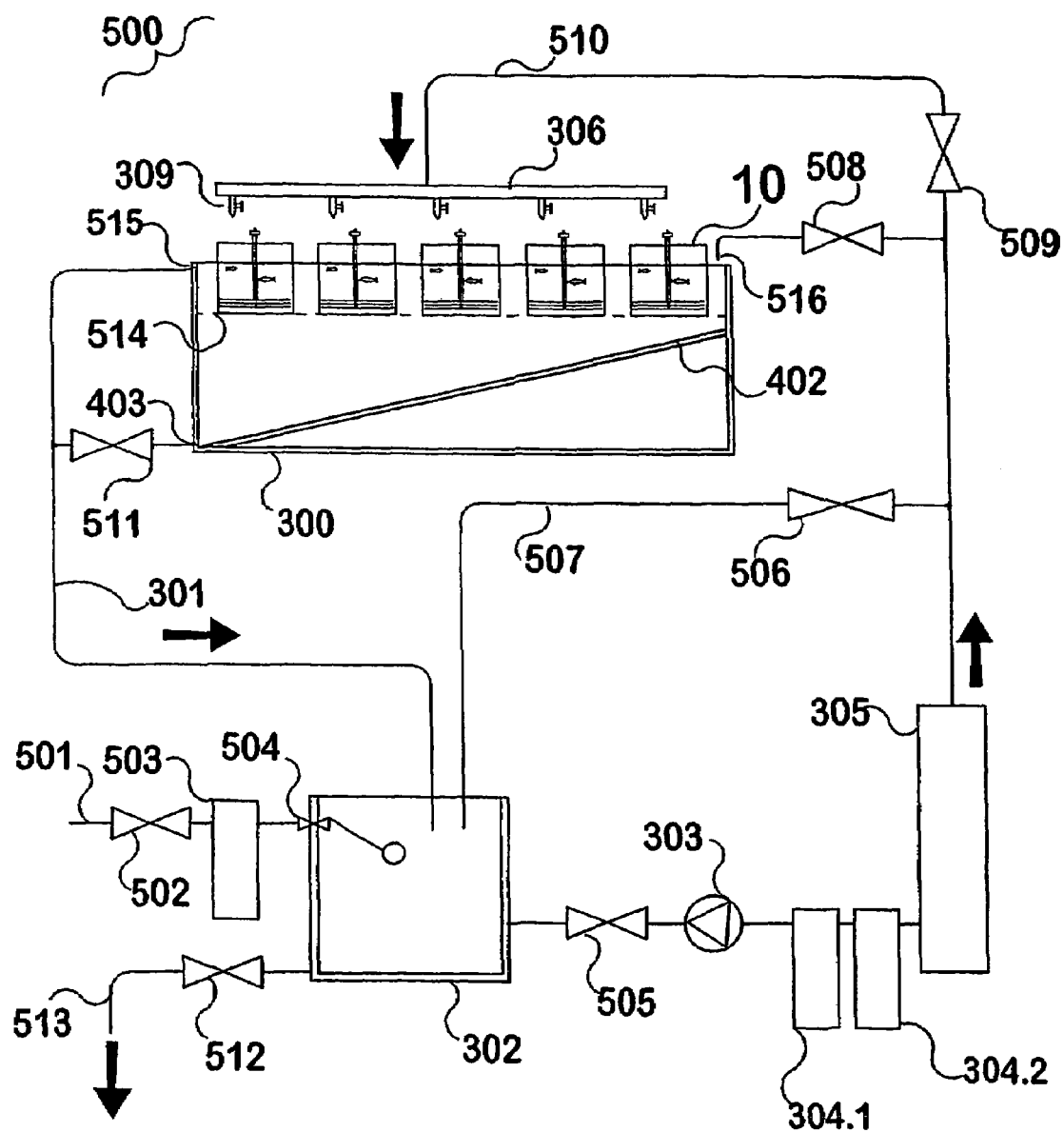
FIG. 5 shows a schematic representation of a recirculating circuit of the system of FIG. 3.

As indicated more clearly in FIG. 5 of the drawings, the filter 304 comprises two components 304.1 and 304.2. The component 304.1 is a 5 microns-nominal filter and the component 304.2 is a 0.2 microns-absolute filter.

The sterilising station 305 is in the form of an ultraviolet sterilising light which omits ultraviolet light of the appropriate wavelength to sterilise water circulating in the circulating arrangement 306 before it is fed back to the containers 10 in the tank 300.

The circulating arrangement 306 includes a temperature regulator 310 for controlling the temperature of the water in the tank 300, especially for temperature sensitive aquatic animals or those which may require a special temperature regime.

Figure 4A:
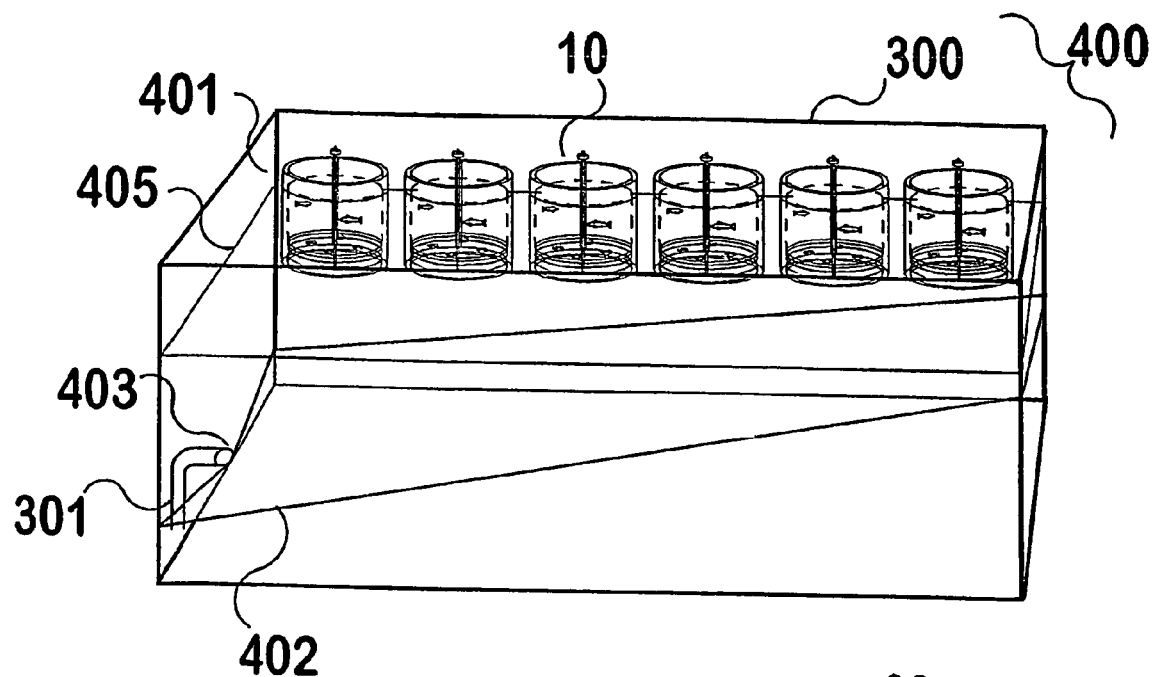
FIG. 4a shows a three-dimensional view of one embodiment of a vessel of the system of FIG. 3.
Figure 4B:
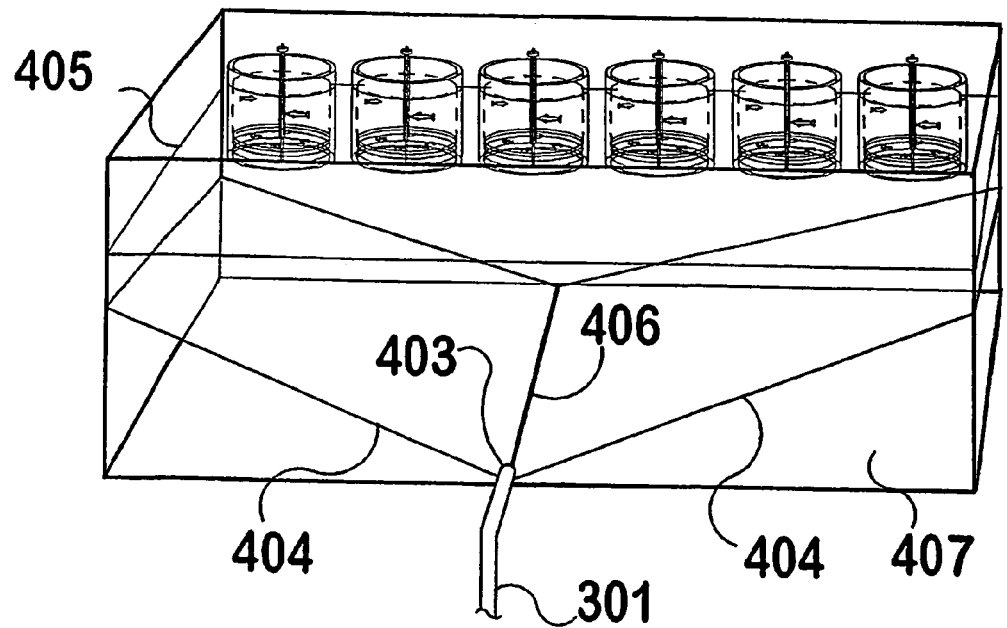
FIG. 4b shows a three-dimensional view of another embodiment of a vessel of the system of FIG. 3.

Referring now to FIGS. 4a and 4b of the drawings, schematic three dimensional representations of the tank 300 are shown containing one row 401 of containers 10. An end wall 405 of the tank 300 has an outlet opening 403 in communication with the pipe 301. The tank 300 has a sloping floor 402 sloping downwardly towards the outlet opening 403. Moreover, that end of the floor 402 at the outlet opening is of a shallow V-shape with an "apex" of the "V" being in register with the outlet opening 403 to encourage the flow of detritus out of the volume 300.1 of the tank 300 into the reservoir 302 of the circulating arrangement 306.

In the embodiment of the invention shown in FIG. 4b of the drawings, the outlet opening 403 is, instead of being defined in the end wall 405 of the tank 300, defined in a side wall 407 of the tank 300.

In this embodiment, the floor 402 comprises two panels 404 which meet at a junction 406. The panels 404 slope downwardly from the side walls 405 towards the junction 406 in the centre of the tank 300. The junction 406 also slopes downwardly from one of the side walls to the opposite side wall 407 having the outlet opening 403 defined therein. In this way, detritus is encouraged to flow through the pipe 301 into the reservoir 302 of the circulating arrangement 306.

It will be appreciated that the false floor 402 could, instead of being of a substantially V-shape, be a W-shape with two outlet openings 403 to provide even steeper slopes.

Referring now to FIG. 5 of the drawings, a recirculating circuit 500 of the system 50 is illustrated.

A water mains supply 501 is fed through a control valve 502 and an activated carbon filter 503 (in order to remove chlorine, organic acids and other taste and odour imparting compounds) for use in maintaining water at a predetermined level in the reservoir 302. The water level is monitored by a level control valve 504.

A drainage outlet 513 having a control valve 512 is provided for draining the reservoir 302 from time to time.

Water from the reservoir 302 is fed to the pump 303 through a valve 505.

Sterile water from the sterilising station 305 is fed through a valve 509 and supply line 510 into the supply manifold 307 (not shown in FIG. 5 of the drawings) and, thereafter, into the branch pipes 308. A bleed line 507 branches off the line 510 downstream of the sterilising station 305 but upstream of the valve 509. A throttle valve 506 is mounted in the line 507. The valve 506 remains partially open in use so that excess water is bled off the line 510 and is diverted to the reservoir 302. In use, as the filter 304 fouls as a result of its filtering action, the flow rate of water in the line 510 reduces. Therefore, to maintain the flow rate of water in the line 510 at the desired rate, the valve 506 is progressively closed in response to the filter 304 progressively clogging. This results in less water being diverted into the line 507 allowing a greater volume of water to be directed through the line 510 into the tank 300.

A valve 511 is arranged above the outlet opening 403. The valve 511 is an overflow valve. The outlet opening 403 connects to an outlet of the valve 511 at a raised level relative to the outlet opening 403 via a riser. This arrangement maintains the level of water in the tank 300 at the desired height.

For rapid filling of the tank 300, a further valve 508 is arranged upstream of the valve 509.

In use, the containers 10, also known as "fry pots", are mounted on the structure 514 in the tank 300 so that one container 10 is mounted beneath each tap 309 to form an array of containers 10 in the tank 300, as shown in FIG. 3 of the drawings. The containers 10 are partially immersed in the water in the tank 300 as shown schematically by the water meniscus 200 in FIG. 2 of the drawings.

Each container 10 has its closure plate 103 spaced from the support member 102 of the floor portion 12 so that water can flow through the openings in the floor portion 12 of the container 10. Water is drip fed through each tap 309 so that a slight current is built up in each container 10 which encourages the flow of detritus through the openings in the floor portion 12 of each container 10 without allowing escape of the aquatic animals, such as zebrafish, accommodated in the containers 10.

The water within the tank 300 is, as previously described, sterilised. When the tank 300 is initially charged with water, the water should have an acceptable pH, hardness, conductivity, osmolarity and should be free of toxic ions.

Once water of the acceptable quality has been charged into the tank 300, the containers 10 are populated with their animals to be reared. An adequate supply of appropriate food is added from time to time. The water is drip fed through the taps 309 at a predetermined and controlled rate of approximately 10 ml of water per one to five minutes. Water droplets breaking on the surface of water in the containers 10 break up surface film which may arise from use of powered food and, further, the breaking of the water droplets oxygenates the water in the containers 10.

A similar quantity of water steadily is discharged through the openings in the floor portion 12 of each container 10 to set up a slight current in the containers 10. It will be appreciated that, due to the low flow rate of water, the current is very slight and it will not adversely affect young of aquatic animals contained in the containers 10.

It is a simple matter to remove a container 10 from the tank 300 together with its contents. This is effected by rotating the knurled wheel 110 to bring the closure plate 103 into sealing abutment with the support member 102 to close off the openings in the floor portion 12. The entire container 10, together with its contents of aquatic animals, can then be lifted free of the tank 300. The water and aquatic animals in the container 10 can be decanted into a transport bag or into another container 10. Access can then be gained to the filter 105 for cleaning and/or replacement purposes.

Detritus falling through the openings in containers 10 in the tank 300 land on the floor 402. Due to the sloping nature of the floor 402, the detritus is directed to the outlet opening 403 and from there, through the pipe 301 into the reservoir 302.

In the reservoir 302, the detritus is treated by the biofilter to convert ammonia and nitrites into nitrates. The nitrates remain in solution and are not harmful to the aquatic animals. Micro-organisms are filtered by the filter 304 down to 0.2 micron level and any remaining, unfiltered micro-organisms that might have escaped through the filter 304 are sterilised by the sterilising station 305 before the treated water is fed back, via the manifold 307, 308, into the containers 10.

Figure 6:
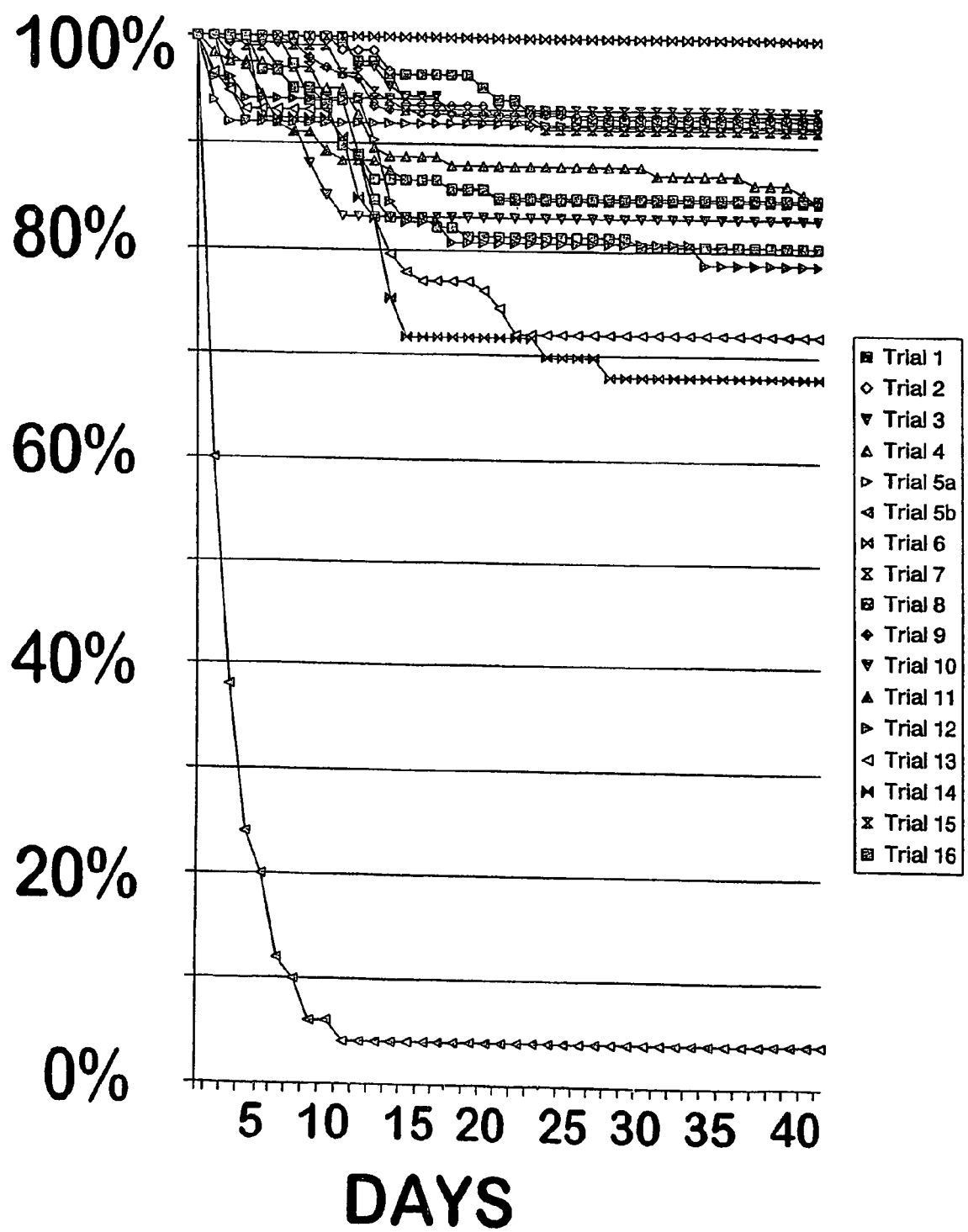
FIG. 6 shows a graph of zebrafish fry survival against time using the system of FIG. 3.

Trials done with the system 50 are shown in FIG. 6 of the drawings where trial 5b is a trial done on a cohort of zebrafish using a prior art system. The remaining trials 1–5a and 6 to 16 show the survival rate of various strains of zebrafish using the system 50, according to the invention.

The containers 10 and system 50 provide a self contained rearing nursery which raises the amount of biomass that can be held in a given space. Applications of the system 50 include rearing zebrafish after changes have been made to their genomes and supporting screening programs such as mutagenesis screening, transgenesis screening and knockdown gene effects screening. The more friendly environment provided by the system 50 raises the survival rate thereby providing more effective research results.

The system 50 also assists in maintaining strains of aquatic animals which are poor survivors, re-deriving species from eggs and sperm after disease outbreaks and multiplying species from a limited amount of stock. This may also entail making commercial quantities of fry, larva or spat of various aquatic animals available for aquaculture purposes.

The recirculating arrangement 306 of the system 50 provides an effective means for maintaining high water quality for encouraging survival of the aquatic animals. This is also enhanced by the fact that low currents are maintained in the system 50 so that the use of energy by the aquatic animals in the containers 10 in swimming against the current is minimised.

It is an advantage of the invention that a container 10 can be removed and its filter 105 easily replaced to allow fry of any size to be maintained in the container 10 while allowing uneaten food and faecal waste to pass through the containers 10.

The modular nature of the system 50, due to the use of the separate containers 10, also facilitates moving the aquatic animals with minimal trauma to the aquatic animals. A simple mechanism is provided for converting a flow-through container into a sealed container. The sealing action is physically separated from the aquatic animals being on the downstream side of the filter 105.

As indicated in FIG. 6 of the drawings, the system 50 results in a significantly greater survival rate, in comparison with prior art systems of which the applicant is aware, of aquatic animals at least to a juvenile stage where they have matured sufficiently to become relative resistant to trauma.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A container for rearing aquatic animals, the container including:
   a floor portion which defines at least one opening;
   a wall portion bounding the floor portion to form, together with the floor portion, a chamber for receiving the aquatic animals to be reared;
   a filtering means arranged in the at least one opening;
   a closure means for openably closing the at least one opening, the closure means being arranged outwardly of, and operatively below, the floor portion; and a displacement mechanism associated with the closure means for displacing the closure means relative to the floor portion, the displacement mechanism passing through the floor portion and being accessible from a side of the floor portion opposite to a side of the floor portion on which the closure means is arranged.

2. The container of claim 1 in which the floor portion comprises a multi-layered structure.

3. The container of claim 2 in which the multi-layered structure comprises a support member for supporting the filtering means and a retaining member for retaining the filtering means relative to the support member with the filtering means being interposed between the support member and the retaining member.

4. The container of claim 3 in which the support member defines at least one passage with the retaining member also defining at least one passage, the passages of the support member and the retaining member being in register with each other to define the at least one opening in the floor portion.

5. The container of claim 4 in which each of the support member and the retaining member define a plurality of passages to form a plurality of openings in the floor portion.

6. The container of claim 3 in which the retaining member is demountably arranged relative to the support member for facilitating access to the filtering means.

7. The container of claim 2 in which the closure means comprises a closure plate displaceably arranged relative to the multi-layered structure.

8. The container of claim 7 in which a sealing means is carried by the closure plate.

9. A system for rearing aquatic animals, the system including:
   a vessel defining a volume;
   at least one container, as claimed in claim 1, supported to lie at least partially within the volume of the vessel; and
   a circulating arrangement for circulating liquid through the at least one container.

10. The system of claim 9 which includes a plurality of the containers arranged in an array, with each of the containers being at least partially in the volume of the vessel.

11. The system of claim 10 in which the circulating arrangement includes a feed manifold arranged above the containers for feeding liquid at a predetermined rate to the containers.

12. The system of claim 11 in which the circulating arrangement includes a liquid treating means arranged upstream of the manifold.

13. The system of claim 12 in which the liquid treating means comprises a filter device and a sterilising station.

14. The system of claim 13 in which the liquid treating means includes a reservoir arranged upstream of the filter device and the sterilising station, the reservoir being in communication with the volume of the vessel for receiving detritus from the vessel.

15. The system of claim 14 in which the reservoir includes a processing means for processing the detritus.

16. The system of claim 15 in which the processing means comprises a biofilter.

17. The system of claim 15 in which the reservoir communicates with an outlet opening of the vessel.

18. The system of claim 17 in which the vessel has an angled bottom with the outlet opening being arranged at a lowest point of the bottom of the vessel so that the detritus is urged towards the outlet opening.

19. The system of claim 10 in which the circulating arrangement includes a circulating means.

20. The system of claim 10 which includes a temperature regulating unit for regulating the temperature of the liquid in the vessel.

* * * * *